United States Patent Office
3,287,458
Patented Nov. 22, 1966

3,287,458
1,4 - DIHYDRO-1-LOWER ALKYL-6,7-METHYLENE-
DIOXY - 4 - OXO - 3 - QUINOLINE-CARBOXYLIC
ACID
Daniel Kaminsky, East Paterson, and Robert I. Meltzer,
Rockaway, N.J., assignors to Warner-Lambert Pharmaceutical Company, Morris Plains, N.J., a corporation
of Delaware
No Drawing. Filed Apr. 27, 1966, Ser. No. 546,158
14 Claims. (Cl. 260—287)

This application is a continuation-in-part of our copending application, Serial No. 330,009, filed December 12, 1963.

This invention relates to new and novel compositions of matter. More particularly, this invention relates to 1,4-dihydro-1-lower alkyl and alkenyl-6,7-methylenedioxy-4-oxo-3-quinoline-carboxylic acids of the formula:

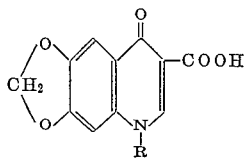

wherein R is lower alkyl such as methyl, ethyl, propyl, isopropyl, butyl, isobutyl, or cycloalkyl such as cyclopropyl, cyclobutyl, cyclohexyl, or lower alkenyl such as allyl or vinyl and to the alkali metal salts thereof. R may also be a substituted lower alkyl such as hydroxy lower alkyl or carboxy lower alkyl or aralkyl, such as phenyl lower alkyl in which lower alkyl has the same meaning as defined.

This invention also includes within its scope therapeutic compositions containing the above compounds which are particularly useful in the treatment of bacterial infections.

The numbering of the compounds of this invention is as follows:

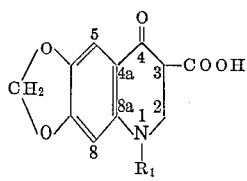

The compounds of this invention and the alkali metal salts thereof exhibit anti-bacterial properties and are thus useful as therapeutic agents in treating certain bacterial infections in both man and animals.

We have found that these compounds possess outstanding anti-bacterial activity against Gram negative organisms. Among the Gram negative organisms, there may be mentioned, for example, the Escherichia group, the Proteus group and the like. A unique feature of these compound resides in their bactericidal activity against those bacteria which are commonly resistant to known chemotherapeutic agents. Thus, for example, a strain of Proteus mirabilis which is resistant to nalidixic acid has been found to be quite sensitive to our novel compounds.

This unique feature coupled with their low toxicity provides an outstanding therapeutic tool in treating both systemic and topical infection caused by bacteria sensitive to the compounds disclosed.

According to this invention, the novel compounds of this invention are prepared first nitrating methylenedioxybenzene of the formula:

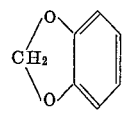
I with dilute nitric acid to form a compound of the formula:

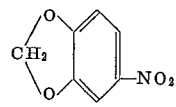
II

The reduction of the nitro group to the corresponding amine group is effected employing conventional catalytic reducing processes. For example, the reduction may be effected by employing gaseous hydrogen and platinum dioxide as the catalyst. The reduced compound has the formula:

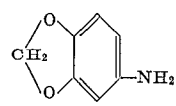
III

In the third step in this synthesis, Compound III is condensed with diethyl ethoxymethylene malonate of the formula:

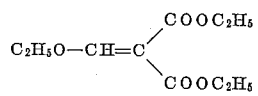

to form a compound of the formula:

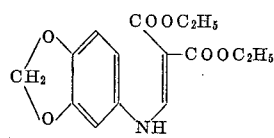
IV

Heating of Compound IV in a suitable inert heat transfer medium to a temperature of about 200 to 265° C. results in a cyclized product of the formula:

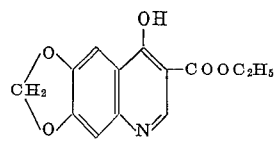
V

Heat transfer media which are particularly advantageous for the above cyclization reaction include, for example, diphenyloxide, mineral oil and like inert media.

Compound V is then treated with the appropriate alkylating, alkenylating or cycloalkylating agent to form the corresponding N-alkyl, alkenyl or cycloalkyl derivative of the formula:

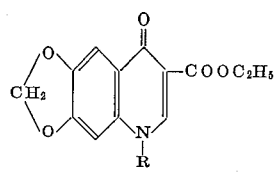
$V_I$ wherein R is lower alkyl, alkenyl or cycloalkyl.

Alkylating agents suitable for this reaction are, for example, dimethylsulfate, dimethylcarbonate, methylbromide, ethyl iodide, isopropyl iodide (or bromide), propyl iodide (or bromide), butyl iodide (or bromide), isobutyl iodide (or bromide), sec-butyl iodide (or bromide), or diethyl sulfate in an alkali medium. Alkenylating agents suitable for this reaction are, for example, allyl iodide (or bromide or chloride). Cycloalkylating agents suitable for this reaction are, for example, cyclopropyl iodide or bromide.

Finally, compound VI is hydrolyzed at a pH of about 10 to 14 to yield the desired free carboxylic acid compounds of this invention. Alternatively the hydrolysis may be made part of the alkylation step, that is the reaction product formed is in the same reaction vessel without isolation or the hydrolysis may proceed the alkylation. In addition, the above compound VI is also useful as intermediates for the production of other quinoline derivatives such as

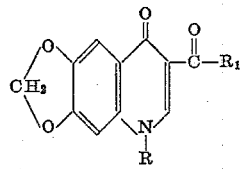

wherein $R_1$ is $NH-(CH_2)_n(NR_2)_2$ or $N(R_2)_2$ in which $n$ may be an integer of from 1 to 5 and $R_2$ may be a mono or di lower alkyl radical such as methyl or dimethyl. These derivatives may be prepared, for example, by reacting Compound VI with an appropriate amine.

The foregoing sequence of reaction steps may be conveniently summarized in the following diagram:

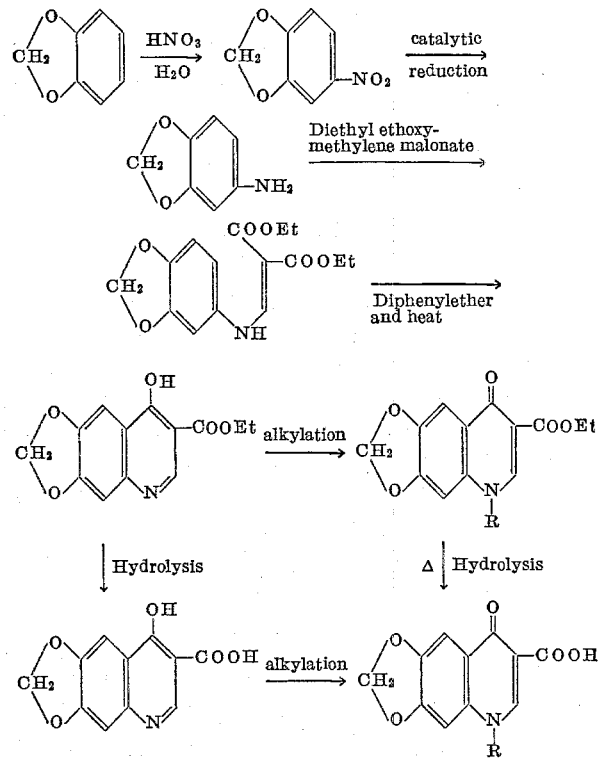

The corresponding alkali metal salts of the above compounds are prepared by reacting the free acid with about an equivalent weight of an alkali. Suitable alkalis are, for example, sodium or potassium hydroxide.

The therapeutic compositions of the invention for oral administration contain the above-described active ingredients in an amount of from about 1 to 100% by weight and when an excipient is employed, they are those standard pharmaceutical carriers as are commonly employed in the manufacture of oral dosage forms for human and veterinary medication. There may be mentioned, for example, solid compositions such as tablets, finely divided powders, pills, and the like, liquid formulations such as elixirs, syrups, suspensions, solutions, and the like.

For veterinary medication, the active ingredients, for example, may be mixed from about 1 to 10% with an animal feed.

The compositions of this invention for parenteral use comprise, for example, sterile isotonic solutions of the sodium salt in an aqueous medium or suspensions of the free acid containing about 0.1 to 10% by weight of the selected active ingredient. These compositions which are suspensions contain the suspended matter in a finely divided form, preferably of a particle size around 0.5 to 10 microns.

The compositions of this invention also include compositions for topical or local application. Such compositions comprise about 1 to 100% by weight of the stated active ingredient and such standard pharmaceutical excipients are commonly used in the manufacture of pharmaceutical formulations for application to local bacterial infection, either external or internal, or, for example, to postoperative wounds requiring local prophylactic and antibacterial treatment. Said compositions include, for example, ointments, creams and finely divided powder preparations.

The compositions of this invention may also include other known anti-bacterials such as the tetracyclines, the nitrofurans, the sulfa drugs and the like to enhance their anti-bacterial spectrum.

In order to further illustrate this invention, the following examples are given:

A mixture of 27 parts by weight of 3,4-methylenedioxyaniline and 43 parts by weight of diethyl ethoxymethylenemalonate is heated at 80°–90° C. for 3 hours. The mixture is then heated at 80°–90° C. for 1 hour under ca. 15 mm. pressure to remove the byproduct ethyl alcohol formed. The residue is recrystallized from ligroin (B.P. 60°–90° C.) to give diethyl[(3,4-methylenedioxyanilino)-methylene]malonate as a yellow solid melting at 100°–102° C. The analytical sample from ligroin melts at 101°–102° C.

EXAMPLE 2

A mixture of 48 parts by weight of diethyl[(3,4-methylenedioxyanilino)-methylene]malonate and 500 parts by weight of diphenyl ether is refluxed for 1 hour. The mixture is allowed to cool to about 25° C. with stirring and 500 parts by weight of petroleum ether are added. Filtration gives 3-carbethoxy-6,7-methylenedioxy-4-hydroxy-quinoline as a brown solid, M.P. 276–281° C. Several recrystallizations from dimethylformamide gives almost colorless analytical material, M.P. 285–286° C. (decomposes).

EXAMPLE 3

A mixture of 8 parts by weight of 3-carbethoxy-6,7-methylenedioxy-4-hydroxy-quinoline, 6.3 parts by weight of dimethyl sulfate and 5 parts by weight of sodium hydroxide in 500 parts by weight of water is stirred for 2 hours at 20–25° C. To this is added an additional 6.3 parts by weight of dimethyl sulfate and 5 parts by weight of sodium hydroxide in 100 parts by weight of water. This mixture is stirred for 2 hours at 20–25° C. The mixture is refluxed for 4 hours, treated with decolorizing charcoal, filtered and the filtrate acidified to precipitate 1 - methyl - 1,4 - dihydro - 6,7 - methylenedioxy - 4 - oxo - 3-quinolinecarboxylic acid as a tan solid, M.P. 307–316° C. The recrystallized product obtained from dimethylformamide is a colorless solid, M.P. 339–340° C.

EXAMPLE 4

A mixture of 26 parts of 3-carbethoxy-6,7-methylenedioxy-4-hydroxy-quinoline, 16 parts of sodium hydroxide and 50 parts of dimethylformamide is heated at 70–75° for 2 hours, then 31 parts of ethyl iodide is added over 1 hour with continued heating and stirring. After an additional 3–4 hours of heating (at 70–75°) and stirring, the mixture is diluted with 500 parts of water, refluxed for 3–4 hours, acidified with conc. hydrochloric acid and filtered to yield 18–22 parts of 1-ethyl-1,4-dihydro - 6,7 - methylenedioxy - 4 - oxo - 3 - quinolinecarboxylic acid, M.P. 309–314° C. (decomposes). The analytical sample from dimethylformamide melts at 314–316° C. (decomposes).

EXAMPLE 5

A mixture of 17 parts of 3-carbethoxy-6,7-methylenedioxy-4-hydroxy-quinoline, 350 parts of dimethylformamide and 1.4 parts of sodium hydride is heated at 70–90° C. for 1 hour. A solution of 17 parts of isopropyl iodide in 35 parts of dimethylformamide is added and the mixture heated, with stirring, at 70–90° C. for 20 hours. The solvents are removed under vacuum (50–70° C./ca. 1 mm.) and the residue is diluted with 250 parts of 5% sodium hydroxide solution. This mixture is refluxed for 2 hours, treated with charcoal, filtered and the filtrate acidified with conc. hydrochloric acid to yield 10–12 parts of 1,4-dihydro-1-isopropyl-6,7-methylenedioxy-4-oxo-3-quinolinecarboxylic acid, M.P. 292–294° C. (decomposition). Analytical sample from acetonitrile melts at 294–296° C. (decomposition).

EXAMPLE 6

Following the procedure described in Example 5 using 34 parts of n-propyl iodide (instead of isopropyl iodide) there is obtained 14 parts of 1,4-dihydro-6,7-methylenedioxy-4-oxo-1-propyl-3-quinoline-carboxylic acid, M.P. 271–273° C. (decomposition). Analytical sample from 90% aqueous dimethylformamide melts at 272–274° C. (decomposition).

EXAMPLE 7

Following the procedure described in Example 5 and using 25 parts of allyl bromide (instead of isopropyl iodide) there is obtained 12–14 parts of 1-allyl-1,4-dihydro - 6,7 - methylenedioxy - 4 - oxo - 3 - quinolinecarboxylic acid, M.P. 279–282° C. (decomposes). The analytical sample from 90% aqueous dimethylformamide melted at 282–284° C. with decomposition.

EXAMPLE 8

Following the procedure described in Example 5 and using 22 parts of n-butyl iodide (instead of isopropyl iodide) there is obtained 16 parts of 1-butyl-1,4-dihydro-6,7 - methylenedioxy - 4 - oxo-3-quinolinecarboxylic acid, M.P. 229–231° C. The analytical sample from 80% aqueous dimethylformamide melted at 232–233° C.

EXAMPLE 9

Following the procedure described in Example 5 and using 18 parts of sec-butyl iodide (instead of isopropyl iodide) there is obtained 8–10 parts of 1-sec-butyl-1,4-dihydro-6,7-methylenedioxy-4-oxo-3-quinoline carboxylic acid, M.P. 250–253° C. Analytical sample from 95% ethanol melts at 255–257° C.

EXAMPLE 10

Following the procedure described in Example 5 and using 15 parts of isobutyl iodide (instead of isopropyl iodide) there is obtained 11–13 parts of 1,4-dihydro-1-isobutyl - 6,7 - methylenedioxy - 4 - oxo - 3 - quinoline carboxylic acid, M.P. 283–286° C. Analytical sample from 80% aqueous dimethylformamide melts at 287–289° C.

EXAMPLE 11

Following the procedure described in Example 5 and using 18 parts of n-hexyl bromide (instead of isopropyl iodide) there is obtained 6–8 parts of 1-hexyl-1,4-dihydro-6,7-methylenedioxy-4-oxo-3-quinoline carboxylic acid, M.P. 172–176° C. Recrystallization from 1:1 dimethylformamide:95% ethanol resulted in the analytical sample, M.P. 180–182° C.

EXAMPLE 12

Following the procedure described in Example 5 and using 20 parts of n-octyl bromide (instead of isopropyl iodide) there is obtained 6–8 parts of 1,4-dihydro-6,7-methylenedioxy-1-octyl-4-oxo-3-quinoline carboxylic acid, M.P. 150–153° C. The analytical sample from 70% aqueous dimethylformamide melts at 156–158° C.

EXAMPLE 13

Following the procedure described in Example 5 and using 11 parts of benzyl bromide (instead of isopropyl iodide) there is obtained 13–17 parts of 1-benzyl-1,4-dihydro - 6,7 - methylenedioxy - 4 - oxo - 3 - quinoline carboxylic acid, M.P. 299–303° C. (decomposes). The analytical sample from 80% aqueous dimethylformamide melts at 313–315° C. (decomposes).

EXAMPLE 14

Following the procedure described in Example 5 and using 15 parts of 2-bromoethanol (instead of isopropyl iodide) there is obtained 16–18 parts of 1,4-dihydro-1-(2 - hydroxyethyl) - 6,7 - methylenedioxy - 4 - oxo - 3 - quinoline carboxylic acid, M.P. 300–302° C. Recrystallization from dimethylformamide gives the analytical sample, M.P. 304–305° C.

EXAMPLE 15

Following the procedure described in Example 5 and using 13 parts of ethyl bromoacetate (instead of isopropyl iodide) there is obtained 16–18 parts of 3-carboxy-1,4-dihydro - 6,7 - methylene - dioxy - 4 - oxo - 1 - quinolineacetic acid, M.P. 311–314° C. (decomposes). The analytical sample from dimethylformamide melts at 316–317° C. (decomposes).

It is to be understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

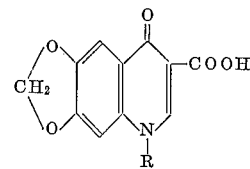

wherein R is a member of the group consisting of lower alkyl, cycloalkyl, hydroxy lower alkyl, phenyl lower alkyl, carboxy lower alkyl and lower alkenyl and the alkali metal salts thereof.

2. A compound selected from the group consisting of 1 - methyl - 1,4 - dihydro - 6,7 - methylenedioxy - 4 - oxo-3-quinoline-carboxylic acid and the alkali metal salts thereof.

3. A compound selected from the group consisting of 1 - ethyl - 1,4 - dihydro - 6,7 - methylenedioxy - 4 - oxo-3-quinoline-carboxylic acid and the alkali metal salts thereof.

4. A compound selected from the group consisting of 1 - butyl - 1,4 - dihydro - 6,7 - methylenedioxy - 4 - oxo-3-quinoline-carboxylic acid and the alkali metal salts thereof.

5. A compound selected from the group consisting of 1 - propyl - 1,4 - dihydro - 6,7 - methylenedioxy - 4 - oxo-3-quinoline-carboxylic acid and the alkali metal salt thereof.

6. A compound selected from the group consisting of 1 - isopropyl - 1,4 - dihydro - 6,7 - methylenedioxy - 4- oxo-3-quinoline-carboxylic acid and the alkali metal salt thereof.

7. A compound selected from the group consisting of 1 - allyl - 1,4 - dihydro - 6,7 - methylenedioxy - 4 - oxo-3-quinoline-carboxylic acid and the alkali metal salt thereof.

8. 1 - sec - butyl - 1,4 - dihydro - 6,7 - methylenedioxy-4-oxo-3-quinoline-carboxylic acid.

9. 1 - isobutyl - 1,4 - dihydro - 6,7 - methylenedioxy-4-oxo-3-quinoline-carboxylic acid.

10. 1 - hexyl - 1,4 - dihydro - 6,7 - methylenedioxy - 4-oxo-3-quinoline-carboxylic acid.

11. 1 - octyl - 1,4 - dihydro - 6,7 - methylenedioxy - 4-oxo-3-quinoline-carboxylic acid.

12. 1 - benzyl -1,4 - dihydro - 6,7 - methylenedioxy-4-oxo-3-quinoline-carboxylic acid.

13. 1 - (2 - hydroxyethyl) - 1,4 - dihydro - 6,7 - methylenedioxy-4-oxo-3-quinoline-carboxylic acid.

14. 3 - carboxy -1,4 - dihydro - 6,7 - methylenedioxy-4-oxo-1-quinolineacetic acid.

No references cited.

ALEX MAZEL, *Primary Examiner.*

DONALD G. DAUS, *Assistant Examiner.*